United States Patent [19]

Ruf

[11] Patent Number: 4,806,362

[45] Date of Patent: Feb. 21, 1989

[54] AQUEOUS POLYETHYLENE DISPERSIONS, THEIR PRODUCTION AND METHODS FOR FINISHING GLASS SURFACES WITH THE DISPERSIONS

[75] Inventor: Erich Ruf, Essen, Fed. Rep. of Germany

[73] Assignee: Th. Goldschmidt AG, Essen, Fed. Rep. of Germany

[21] Appl. No.: 69,657

[22] Filed: Jul. 6, 1987

[30] Foreign Application Priority Data

Jul. 19, 1986 [DE] Fed. Rep. of Germany ....... 3624546

[51] Int. Cl.⁴ .............................................. B05D 3/02
[52] U.S. Cl. .................................. 427/389.7; 252/311; 524/217; 524/220; 524/230; 524/232
[58] Field of Search ............... 427/389.7, 407.2, 419.5; 252/311; 524/217, 220, 232, 230

[56] References Cited

U.S. PATENT DOCUMENTS 3,161,539 12/1964 Dettre et al. ...................... 427/419.5
3,498,819  3/1970 Lyle et al. ......................... 427/419.5
3,799,795  3/1974 Crawford et al. ................ 427/419.5
3,814,715  6/1974 Halley et al. ....................... 524/217

FOREIGN PATENT DOCUMENTS 0128852  8/1983 Japan ................................ 427/419.5

Primary Examiner—Janyce Bell

Attorney, Agent, or Firm—Toren, McGeady & Associates

[57] ABSTRACT

Aqueous polyethylene dispersions, suitable for improving the surface characteristics of glass, are disclosed. The dispersions contain 40 to 100 percent by weight, based on the polyethylene, of a mixture of
(a) amine oxides of the general formula

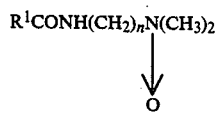

I wherein
$R^1$ is alkyl with 7 to 17 carbon atoms;
n is 2 or 3 and
(b) the salt of an amine of the general formula

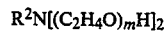

II with a physiological safe carboxylic acid, wherein $R^2$ is alkyl with 8 to 18 carbon atoms and the sum of the units m is 20 to 100,
the components (a) and (b) being present in a ratio by weight of 4:1 to 1:1.

The dispersions may be obtained by stirring a melt of the polyethylene, which contains component (b), into water, which contains component (a).

16 Claims, No Drawing

AQUEOUS POLYETHYLENE DISPERSIONS, THEIR PRODUCTION AND METHODS FOR FINISHING GLASS SURFACES WITH THE DISPERSIONS

FIELD OF INVENTION

The invention is directed to aqueous dispersions of polyethylene, in particular of partially oxidized polyethylene, as well as to a method for the preparation of such dispersions. Considered from another aspect, the invention is concerned with a method for the surface improvement or finishing of glass, particularly of glass surfaces comprising metal oxide layers or coatings.

BACKGROUND INFORMATION AND PRIOR ART

The strength of glass depends on the intactness of the glass surface. Immediately after it is produced, the strength of glass is highest. However, the strength falls off when the glass surfaces have nicks or scratches. Numerous methods are therefore known for protecting the surfaces of objects of glass against mechanical damage.

For example, it is known to treat glass objects immediately after they are shaped at temperatures between about 370° and 750° C. with organic and/or organic compounds, especially of titanium, tin or zirconium (the so-called hot-end finishing). With this treatment, thin, colorless, transparent metal oxide coatings are formed on the surfaces of the hot-finished glass objects.

To further increase the scratch hardness and the strength of glass objects and to improve their sliding ability, it is known to apply an additional organic coating applied on glass objects finished with metal oxides in a so-called cold-end finishing process.

For example, a method is described in the German Pat. No. 1,291,448 to increase the scratch hardness and strength of glass objects, especially glass bottles, by producing a thin, colorless, transparent coating on the exterior surfaces of the glass objects. The characteristic feature of this method consists therein that thin layers of a pyrolyzable inorganic salt or of a pyrolyzable organic compound of titanium, zirconium, tin or vanadium, applied on the glass objects, are decomposed pyrolytically on the glass objects at temperatures between 370° and 705° C. to the corresponding metal oxides, the glass objects are cooled to temperatures between 230° and 65.5° C. and an olefin polymer, a polyurethane, a polystyrene or an acetate salt of an alkylamine is sprayed on the still hot glass surfaces. An example of an olefin polymer is a polyethylene wax of low molecular weight, which is used in the form of an aqueous emulsion. As emulsifier, the alkali metal salt of a fatty acid, especially potassium oleate is used. The thickness of the coating on the glass object is about 1 μm. These films of polyethylene wax are, however, not resistant to soap suds and, when the vessel is cleaned, are detached after a relatively short time by the surface active substances of the cleaning liquor.

From the German Pat. No. 2,412,068, a glass container is known, which is coated with a metal oxide, especially with tin oxide, and, on top of this, with an insoluble organic compound, and which has an intermediate layer of a fatty acid between these two coatings. According to this patent, the glass container is finished by first coating it in a hot-end treatment with a metal oxide, especially with tin oxide, applying a fatty acid on the metal oxide coating while the container is at a temperature of 90° to 130° C. and then applying an insoluble organic coating, while the vessel is at a temperature of 90° to 150° C. As fatty acid, oleic acid may be used. The insoluble organic coating preferably consists of polyethylene. The alkali resistance is said to be increased by the intermediate layer formed from the fatty acid. The polyethylene itself is applied in the form of a polyethylene emulsion, which contains potassium oleate as emulsifier. The resistance of these insoluble organic coatings to attack by hot, alkaline washing liquors, however, is still not satisfactory. The method, moreover, is technically cumbersome and disadvantageous due to the need for the application of three layers. The use of alkali salts of fatty acids as emulsifiers generally has the disadvantage that polyethylene dispersions are unstable in the presence of salts which cause water to be hard.

OBJECTS OF THE INVENTION

It is an object of the present invention to provide aqueous polyethylene dispersions, which are particularly suitable for finishing glass surfaces, such as the outer surfaces of glass bottles, by increasing the scratch resistance and smoothness of the glass objects and by having a greater resistance to attack by aqueous cleaning liquors. The dispersed particles of the dispersions should be finely divided and have a high stability.

It is also an object of this invention to provide a simple and efficient method for preparing the dispersions and for improving the surface characteristics of the glass objects. Generally, it is an object of the invention to improve on the art of aqueous polyethylene dispersions, methods for their preparation and methods for improving glass surfaces.

SUMMARY OF THE INVENTION

The above objects are superiorly obtained by using pursuant to this invention aqueous dispersions of polyethylene, which are characterized by containing 40 to 100 percent by weight, based on the polyethylene, of a mixture of (a) amine oxides of the general formula

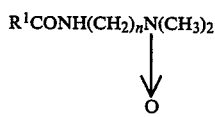

$$R^1CONH(CH_2)_nN(CH_3)_2 \quad\quad I$$

wherein
$R^1$ is alkyl with 7 to 17 carbon atoms;
n is 2 or 3 and
(b) the salt of an amine of the general formula

$$R^2N[(C_2H_4O)_mH]_2 \quad\quad II$$

with a physiologically safe carboxylic acid, wherein $R^2$ is alkyl with 8 to 18 carbon atoms and
the sum of the units m is 20 to 100.
the components (a) and (b) being present in a ratio by weight of 4:1 to 1:1.

A polyethylene with a molecular weight in the range of 500 to 10,000 is preferably used. Preferably, the polyethylene is partially oxidized. Especially preferred is a partially or surface oxidized polyethylene with a dropping point of 100° to 105° C., an acid number of 20 to 40 and a saponification number of 20 to 70 and especially of 40 to 60.

The content of components (a) and (b) in the dispersion is of crucial importance to the invention. The compounds as such are known. They have, however, not been suggested for the purpose here involved. Likewise, the combination of the two compounds is new.

Component (a) is formed by an amine oxide of the formula

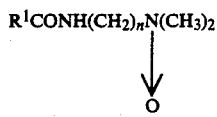

I wherein $R^1$ is alkyl with 7 to 17 carbon atoms. The alkyl entity corresponds to the alkyl entity of a generally naturally occurring fatty acid with 8 to 18 carbon atoms. The alkyl entities $R^1$ may also be present in the form of a mixture of different alkyl entities, which, on the average, have 7 to 17 carbon atoms.

The subscript n has a numerical value of 2 or 3, and is preferably 3.

The amine oxide of formula I may be synthesized by reacting a fatty acid or fatty acid mixture or the ester of the fatty acid with dimethylaminoethylamine or dimethylaminopropylamine and then oxidizing the amidamine with hydrogen peroxide solution in a known manner.

Component (b) comprises the salt of an amine of the general formula

II wherein $R^2$ corresponds to but need not be identical with $R^1$. The sum of the units m is 20 to 100. Especially acetic acid is suitable as the physiologically safe carboxylic acid.

Component (b) can also be synthesized in a known manner by adding ethylene oxide to the alkylamine $R^2NH_2$, until the sum of the added ethylene oxide units is 20 to 100, and reacting the product obtained with at least equivalent amounts of acetic acid.

Components (a) and (b) are present in a ratio by weight of 4:1 to 1:1 and preferably of 2:1 to 1.3 to 1.

The inventive dispersions contain 40 to 100 percent by weight, based on the polyethylene, of components (a) and (b). Preferably the dispersions contain 45 to 60 percent by weight of the mixture of components (a) and (b). The polyethylene content in the dispersion is 1 to 40 percent by weight and preferably 10 to 25 percent by weight.

Generally, the dispersion may have the following composition in percent by weight:

|  | Limit Values | Preferred | Particularly Preferred |
|---|---|---|---|
| Polyethylene (partially oxidized) | 1–40 | 1–40 | 1–25 |
| Components a and b | 0.4–30 | 1–20 | 1–15 |
| Water | 98.6–30 | 98–40 | 98–60 |

A further aspect of the invention is a method to produce the dispersions. This method is characterized in that the melt of polyethylene, containing the component (b), is added with intensive stirring to the solution of component (a) in the required amount of water heated to 70° to 95° C., and the dispersion obtained is cooled with further stirring. Preferably, the dispersions should be cooled at a rate of 1° to 5° C./min. A cooling rate of 1° to 2° C./min is especially preferred.

The inventive dispersions may be applied on glass objects having a surface temperature of 80° to 150° C. in known manner by spraying or dipping and draining. Preferably, the finishing process is carried out after a hot-end finishing process. The polyethylene coatings obtained adhere outstandingly well to the glass surfaces and have a high resistance to hot, aqueous washing liquors. The polyethylene coatings obtained withstand more than ten cleaning processes with 2% sodium hydroxide solution, which acts on the surface for about 30 minutes at 80° C. without essentially attacking the metal oxide layer applied by way of the hot-end finishing. This is not possible to the same extent with the polyethylene dispersions known from the art. It is assumed that the dipersions of the invention, because they contain amine derivatives of formulas I and II, have a certain substantivity, which is lacking in the previously used polyethylene dispersions with alkali salts of fatty acids or nonionogenic ethylene oxide derivatives of alkylphenols or fatty alcohols as emulsifier.

In the following example, the preparation of an inventive dispersion and its use for finishing the surface of glass are explained in greater detail, it being understood that the Example is given by way of illustration and not by way of limitation.

EXAMPLE (a) To a 4-L glass flask with stirrer, thermometer, reflux condenser and heatable dropping funnel, are added 1531.1 g of water and 86.5 g of the compound of the general formula I

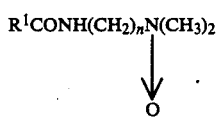

wherein $R^1$ is a mixture of the alkyl entities corresponding to coconut fatty acid and n is 3.

(b) In a 1-beaker, 320 g of partially oxidized polyetylene with a saponification number of 40 to 60 are melted at 135° to 145° C. To this melt, 62.4 g of the salt of an amine of the general formula II

are added, which was obtained by adding 50 moles of ethylene oxide to a coconut fat amine derived from the coconut fatty acid and mixing 100 parts by weight of this product with 8 parts by weight of acetic acid.

The melt is stirred for about 5 to 10 minutes and added to a heated dropping funnel. From this dropping funnel, the melt is added with intensive stirring to the aqueous solution of component (a) above, which has been heated to 90° to 95° C. After the addition is completded, stirring is continued for a further 10 minutes and the dispersion obtained is cooled at a rate of 1° to 2° C./min. A total of 2,000 g of polyethylene dispersion is obtained, which contains 16 percent by weight of dispersed polyethylene.

To demonstrate the superior properties of the inventive dispersion (dispersion 1) so obtained, the following comparison experiment is carried out with a conventional commercial dispersion of polyethylene, which is prepared with nonionogenic emulsifiers (dispersion 2).

Two groups, each of 20 beer bottles, are first hot finished with monobutyl tin trichloride in accordance with the state of the art, until they have a coating of 60 ctu (coating thickness unit). One group of 20 bottles is subsequently sprayed with the inventive dispersion 1 and the other group of 20 bottles with the comparison dispersion 2 at a bottle temperature of 120° C., both dispersions having previously been diluted in the ratio of 1:50 with deionized water. The coating is then allowed to dry. A thin film is formed on the glass surface.

The bottles are now washed for 30 minutes with 2% aqueous sodium hydroxide solution at 80° C.

After 3, 6 and 10 washings, the amount of tin oxide coating still present is determined with a hot-end coating meter. For this, the ctu values of the remaining layer are measured by means of a wear-free test.

This test shows to what extent the polyethylene film is in a position to protect the tin oxide layer against the attack by a sodium hydroxide solution in spite of repeated washing processes.

After 10 washings, the pressure, at which the bottles show scratches or other surface defects when mutually rubbing against one another, is determined by means of the scratch resistance tester.

|  | Dispersion 1 (of the Invention) | Dispersion 2 (Comparison) |
|---|---|---|
|  | Thickness of the Tin Oxide Coating in ctu | |
| Initial Value | 60 | 60 |
| After 3 Washings | 55 | 40 |
| After 6 Washings | 50 | 10 |
| After 10 Washings | 30 | 0 |
| Scratch Resistance Test Values after 10 Washings | 15 kg | <0.5 kg |

As shown by these experiments, the inventive polyethylene dispersion 1 is in a position to offer, aside from its very good smoothness, substantial protection for the hot-end finishing even after 10 washings, while this no longer is the case for the comparison dispersion 2. This protection of the hot-end finishing is important, since hot-end finishing improves the tensile strength of the glass surface and, with that, the resistance to fracture of the glass containers (increased bursting strength) substantially compared to that of glass containers not so finished.

I claim:

1. An aqueous dispersion of polyethylene, comprising 40 to 100 percent by weight, based on the amount of polyethylene, of a mixture of
(a) an amine oxide or an amine oxide mixture of the general formula

wherein
$R^1$ is alkyl with 7 to 17 carbon atoms;
n is 2 or 3, and
(b) the salt of an amine of the general formula

with a physiological safe carboxylic acid, wherein
$R^2$ is alkyl with 8 to 18 carbon atoms and
the sum of the units m is 20 to 100,
the components (a) and (b) being present in a ratio by weight of 4:1 to 1:1.

2. The dispersion of claim 1, wherein said physiologically safe carboxylic acid is acetic acid.

3. The dispersion of claim 1, wherein said polyethylene is partially oxidized and has the following characteristics:
Molecular Weight: 500–10,000
Dropping Point: 100°–105° C.
Acid Number: 20–40 and
Saponification Number: 20–70.

4. The dispersion of claim 1, wherein $R^1$ is a mixture of different alkyl.

5. The dispersion of claim 1, wherein $R^1 = R^2$.

6. The dispersion of claim 1 wherein the weight ratio of components (a) and (b) is between 2:1 to 1.3:1.

7. The dispersion of claim 1, wherein, calculated on the amount of polyethylene, the dispersion comprises 45–60 percent by weight of the mixture of components (a) and (b).

8. The dispersion of claim 1, comprising 10–25 percent by weight of polyethylene.

9. The dispersion of claim 1, comprising in percent by weight:
Polyethylene: 1–40
Components: a and b: 0.4–30
Water: 98.6–30.

10. The dispersion of claim 1, comprising in percent by weight:
Polyethylene: 1–25
Components a and b: 1–15
Water: 98–60.

11. A method of preparing an aqueous dispersion which comprises
(1) preparing an aqueous solution of
a. amine oxides of the general formula

wherein
$R^1$ is alkyl with 7 to 17 carbon atoms;
n is 2 or 3
and heating the solution to 70°–95° C.
(2) preparing a melt of polyethylene comprising
b. the salt of an amine of the general formula

with a physiologically safe carboxylic acid, wherein
$R^2$ is alkyl with 8 to 18 carbon atoms and the sum of the units
m is 20 to 100
(3) adding the melt of (2) to the solution of (1) under intensive stirring and
(4) cooling the dispersion thus obtained, the amounts being chosen such that components (a) and (b) are present in the dispersion in a weight ratio of 4:1 to 1:1, the amount of polyethylene being between about 1–40 percent by weight, the amount of components a and b being about between 0.4–30 percent by weight and the amount of water being between about 98.6–30 percent by weight.

12. The method of claim 11, wherein the polyethylene is partially oxidized and has the following characteristics:
Molecular Weight: 500–10,000
Dropping Point: 100°–105° C.
Acid Number: 20–40 and
Saponification Number: 20–70.

13. The method of claim 11, wherein the cooling of step (4) is effected at a rate of 1° to 5° C./minute.

14. The method of claim 11, wherein the cooling of step (4) is effected at a rate of 1° to 2° C./minute.

15. A method of treating the surface of glass object which comprises applying to the surface an effective amount of the dispersion of claim 1 and drying the surface.

16. The method of claim 15, wherein the glass surface to which the dispersion is applied has a metal oxide coating.

* * * * *